United States Patent
Gochenour et al.

(10) Patent No.: US 7,137,498 B2
(45) Date of Patent: Nov. 21, 2006

(54) CENTRIFUGAL CLUTCH WITH IMPROVED WEAR LIFE AND DISENGAGEMENT CHARACTERISTICS

(75) Inventors: Daniel V. Gochenour, Auburn, IN (US); John A. Schenkel, III, Ft. Wayne, IN (US)

(73) Assignee: Eaton Corporation, Cleveland, OH (US)

( * ) Notice: Subject to any disclaimer, the term of this patent is extended or adjusted under 35 U.S.C. 154(b) by 70 days.

(21) Appl. No.: 10/797,960

(22) Filed: Mar. 11, 2004

(65) Prior Publication Data

US 2005/0199468 A1   Sep. 15, 2005

(51) Int. Cl.
*F16D 43/12* (2006.01)
(52) U.S. Cl. ................................. 192/105 B
(58) Field of Classification Search ............ 192/105 B, 192/105 A
See application file for complete search history.

(56) References Cited

U.S. PATENT DOCUMENTS

| | | | | |
|---|---|---|---|---|
| 1,714,748 | A | * | 5/1929 | Wright .................... 192/105 B |
| 2,432,591 | A | | 12/1947 | Schuckers |
| 2,721,639 | A | * | 10/1955 | Miller ..................... 192/105 B |
| 3,265,172 | A | * | 8/1966 | Kunio et al. ............ 192/105 B |
| 3,709,052 | A | * | 1/1973 | Lassanske ............... 192/105 B |
| 4,384,862 | A | * | 5/1983 | Nakane ................... 192/105 B |
| 4,646,891 | A | | 3/1987 | Braun |
| 4,754,665 | A | | 7/1988 | Vandervoort |
| 5,370,013 | A | | 12/1994 | Reynolds et al. |
| 5,947,251 | A | * | 9/1999 | Goins ...................... 192/89.26 |
| 5,974,354 | A | | 10/1999 | Janecke et al. |
| 5,974,906 | A | | 11/1999 | Stine et al. |
| 6,015,366 | A | | 1/2000 | Markyvech et al. |
| 6,022,295 | A | | 2/2000 | Liu |
| 6,533,056 | B1 | * | 3/2003 | Maimone ................ 192/105 B |
| 6,609,602 | B1 | | 8/2003 | Gochenour et al. |
| 2003/0042105 | A1 | | 3/2003 | Kummer et al. |
| 2003/0042108 | A1 | * | 3/2003 | Gochenour et al. ..... 192/105 C |

FOREIGN PATENT DOCUMENTS

| | | |
|---|---|---|
| DE | 1 087 460 | 8/1960 |
| FR | 1.011.867 | 7/1952 |
| FR | 1.078.656 | 11/1954 |
| GB | 855660 | 12/1960 |
| JP | 2002-21879 A * | 1/2002 |

OTHER PUBLICATIONS

"Belleville Disc Springs", West Coast Lockwasher, Jun. 8, 2003, http://www.wclco.com/pdf/spring/sw095-096.pdf.*
International Search Report dated Jul. 6, 2005 (3 pages).

* cited by examiner

*Primary Examiner*—Rodney H. Bonck

(57) ABSTRACT

A centrifugal clutch assembly is provided that includes a cover module having a pressure plate for applying a clamping force against a friction plate, a moveable plate adapted to rotate with the cover module, but axially displaceable with respect thereto to apply an axial force on the pressure plate through a preloaded plate spring, a fixed plate secured for rotation with the cover module, and a plurality of weights positioned between the moveable plate and the fixed plate that are adapted to move outward under the effects of centrifugal force to cause axial movement in the movable plate and a clamping force on the friction plate. The cover module also includes at least one return spring configured to apply a return force on the weights through the moveable plate, the return force being generally parallel to the axis of rotation of the cover module and independent of weight position.

49 Claims, 13 Drawing Sheets

CENTRIFUGAL CLUTCH WITH IMPROVED WEAR LIFE AND DISENGAGEMENT CHARACTERISTICS

BACKGROUND OF THE INVENTION

1. Field of the Invention

The present invention relates to a centrifugal master clutch for a vehicular drivetrain system and, more particularly, to a centrifugal master clutch having improved wear life and disengagement characteristics.

2. Description of the Related Art

Centrifugally operated friction clutches are well known in the art of vehicular drivetrain systems and typically include an input member driven by a prime mover, usually an electric motor or internal combustion engine, and weights rotatable with the input member which, upon rotation of the driving member, will move radially outwardly under the effect of centrifugal force to cause the input member to frictionally engage a driven output member. Automatically actuated centrifugal clutches employed with heavy-duty electromechanical highway line-haul truck transmissions include so-called centrifugal actuation modules that house the centrifugally actuated weights. The centrifugal modules are drivingly connected to an engine flywheel, and each of a plurality of centrifugally actuated weights is adapted to swing in an arc about a pivot link fixed to the module housing structure. As such, the so-called swing weights contained within the modules are radially outwardly movable against resistive spring forces as a function of engine speed—the higher the speed, the greater the outward movement between limits. Rollers attached to the weights are adapted to roll atop ramp segments that are cammed for clutch engagement and disengagement.

The swing weights are subjected to a number of forces, and thus give rise to issues that work against satisfactory operation of the modules over the useful lives of the clutch. For example, in one known centrifugal clutch, each of the swing weights is biased by its own compression spring(s). In this design, the biasing force exerted on a swing weights by its compression spring(s) is dependent on the position of the swing weight-generally the farther outward the swing weight moves, the greater the spring force exerted on the swing weight. As the friction materials in the clutch wear, the swing weights move farther up the ramp segments to create a given clamp load and the engagement point of the clutch undesirably changes due to the additional compression of the swing weight springs.

Another feature of the above-described prior art centrifugal clutch is the use of two different ramp surfaces on the ramp segments. A first ramp surface exhibits a relatively steep slope and a second ramp surface exhibits a more gradual slope. These ramp surfaces are engaged by swing weight rollers and are used to create a clamp load as the centrifugal force acting on each swing weight increases. Particularly, as the centrifugal force increases, the swing weights will move from their original position on the relatively steep first ramp surface onto the more gradual sloping second ramp surface. Since a centrifugal clutch operates as a balance of forces, any tolerance in the centrifugal module components (e.g., swing weight springs, ramp segments, etc.) may cause a "staggered disengagement", wherein one or more of the swing weights moves from the second ramp surface to the first ramp surface before the other swing weights. This condition is exacerbated in a swing weight style centrifugal clutch since operation of each individual swing weight is essentially independent of the other swing weights.

Accordingly, a need exists for an improved centrifugal clutch that maintains the engagement point of the clutch and avoids staggered disengagement of the centrifugally operated weights.

SUMMARY OF THE INVENTION

A centrifugal clutch assembly is provided that includes an input portion fixed for rotation with an input member and an output portion fixed for rotation with an output member. The output portion includes at least one friction plate secured for rotation with the output member and the input portion includes a cover module secured for rotation with the input member. In an embodiment, the cover module includes a pressure plate for applying a clamping force against the at least one friction plate and a moveable plate adapted to rotate with the cover module, but is axially displaceable with respect thereto to apply an axial force on the pressure plate through a preloaded plate spring. A fixed plate is secured for rotation with the cover module and a plurality of weights are positioned between the moveable plate and the fixed plate. The weights are adapted to move outward under the effects of centrifugal force to cause axial movement in the movable plate and the pressure plate to exert a clamping force on the friction plate. The cover module also includes at least one return spring configured to apply a return force on the weights through the moveable plate, the return force being generally parallel to the axis of rotation of the cover module.

One or more limitations of the prior art are minimized in the clutch assembly of the present invention by operation of the return spring, which applies a return force on the centrifugally operated weights independent of the position of the weights.

BRIEF DESCRIPTION OF THE DRAWINGS

Embodiments of the invention will now be described, by way of example, with reference to the accompanying drawings, wherein.

DETAILED DESCRIPTION OF THE INVENTION

Figure 1:
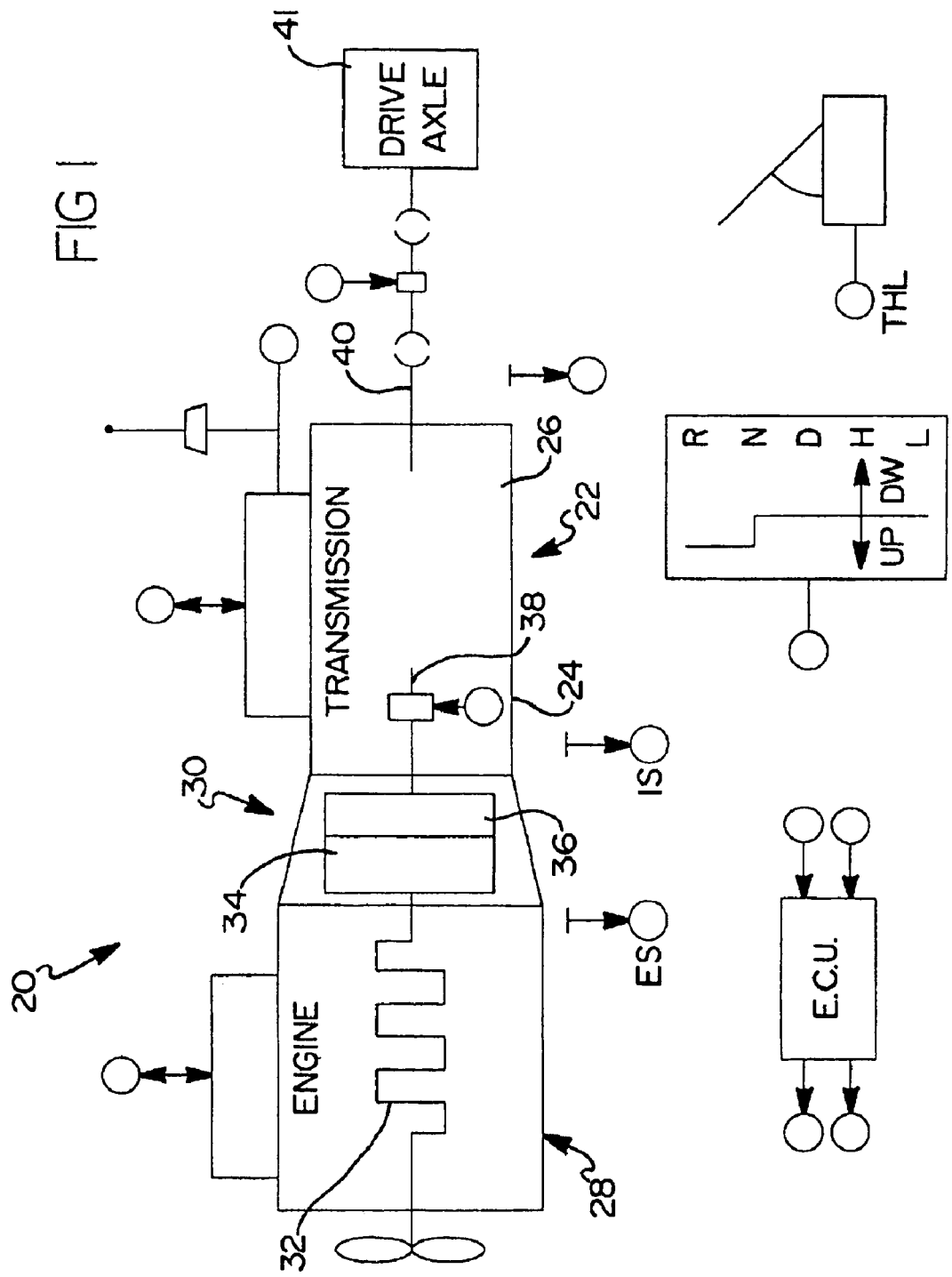
FIG. 1 is a schematic illustration of a vehicular drivetrain system that includes a centrifugal clutch according to an embodiment of the present invention.

A vehicular drivetrain system 20 employing a centrifugally operated master friction clutch of the present invention is schematically illustrated in FIG. 1. By way of example, system 20 may be fully automated, partially automated, or manual operated with controller assist.

In system 20, a change-gear transmission 22 comprising a main transmission section 24 connected in series with a splitter-type auxiliary transmission section 26 is drivingly connected to an internal combustion engine 28, such as a well-known gasoline or diesel engine, by a centrifugal master friction clutch 30 of the present invention. Transmission 22, by way of example, may be of the type well known in the prior art and sold by the assignee of this application, EATON CORPORATION, under the trademarks "Super-10" and "Lightning", and may be seen in greater detail by reference to U.S. Pat. Nos. 4,754,665; 6,015,366; 5,370,013; 5,974,906; and 5,974,354, the disclosures of which are incorporated herein by reference.

Engine 28 includes a crankshaft 32, which is attached to a driving member 34 of centrifugal master clutch 30 that frictionally engages with, and disengages from, a driven member 36 attached to an input shaft 38 of transmission 22. A transmission output shaft 40 extends from the auxiliary transmission section 26 for driving connection to the vehicular drive wheels, as through a drive axle 41 or transfer case.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from a FIG. 1, centrifugal clutch 30 requires no external clutch actuator and is operated as function of the rotational speed (ES) of engine 28. Centrifugal clutch 30 also requires no connections to operating linkages, command signal inputs, power electronics and/or compressed air and/or hydraulic conduits. The most economical application of the present invention is a dry clutch; however, the present invention is also applicable to wet clutch technology.

As is known, rotation of input member 34 will cause clutch 30 to engage and drivingly connect the engine output, usually an engine flywheel or the like, to transmission input shaft 38. The clamping force, and thus the torque transfer capacity of clutch 30 is a function of the rotational speed (ES) of engine 28 and clutch input member 34. Clutch 30 should reach incipient engagement at an engine speed slightly greater than engine idle, and should fully engage at an engine speed lower than the engine speed at which a first upshift is required. Unlike typical spring applied master friction clutches, which are normally engaged, clutch 30 is disengaged at lower engine speeds.

To allow proper vehicle launch and dynamic shifting with the master clutch engaged, clutch 30, once fully engaged, should remain fully engaged at engine speeds greater than (i) the highest expected speed at which downshifts are initiated and (ii) the minimum expected engine speed after an upshift. Incipient engagement of clutch 30 is the initial torque transfer contact of clutch friction surfaces as may be seen by reference to U.S. Pat. Nos. 4,646,891 and 6,022,295, the disclosures of which are incorporated herein by reference.

Figure 2:
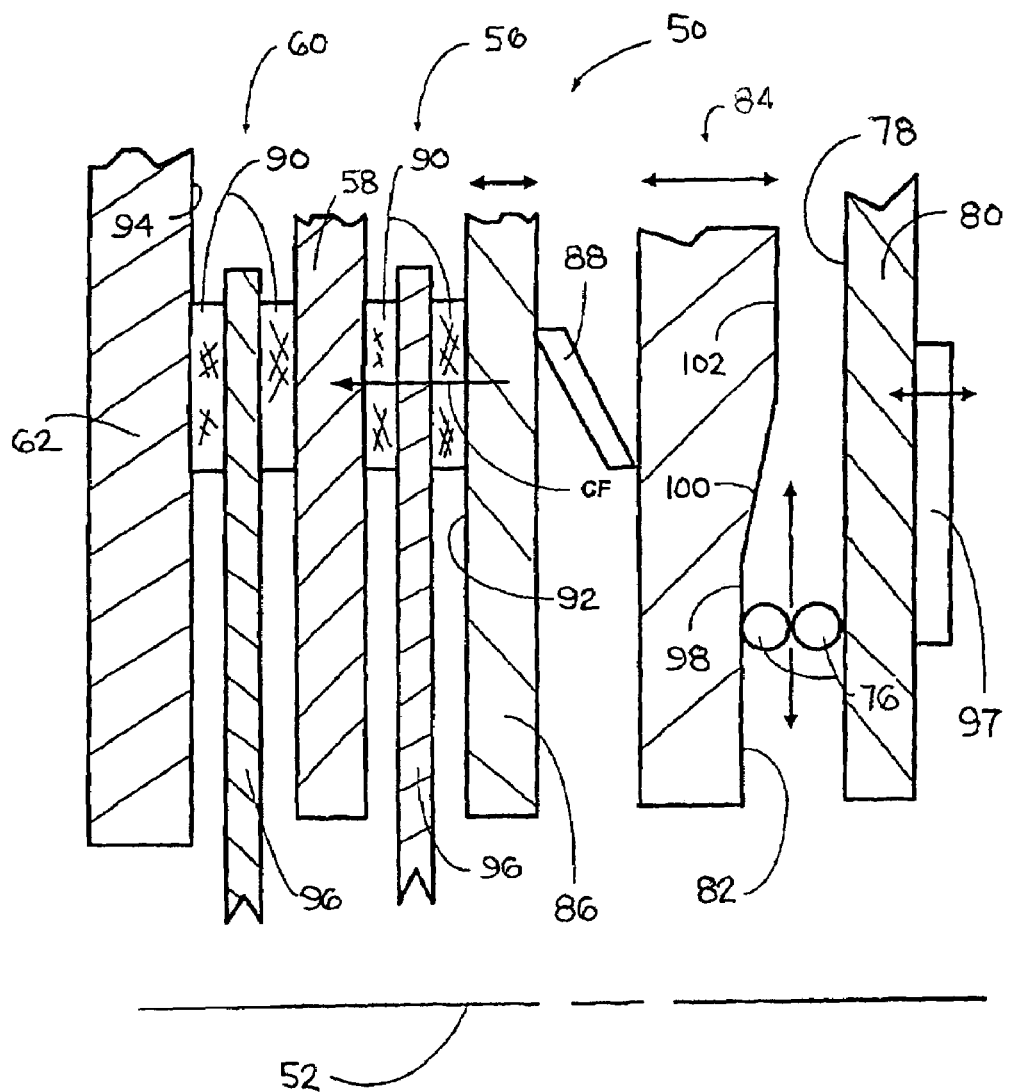
FIG. 2 is a schematic partial sectional view of a prior art centrifugal clutch.
Figure 3:
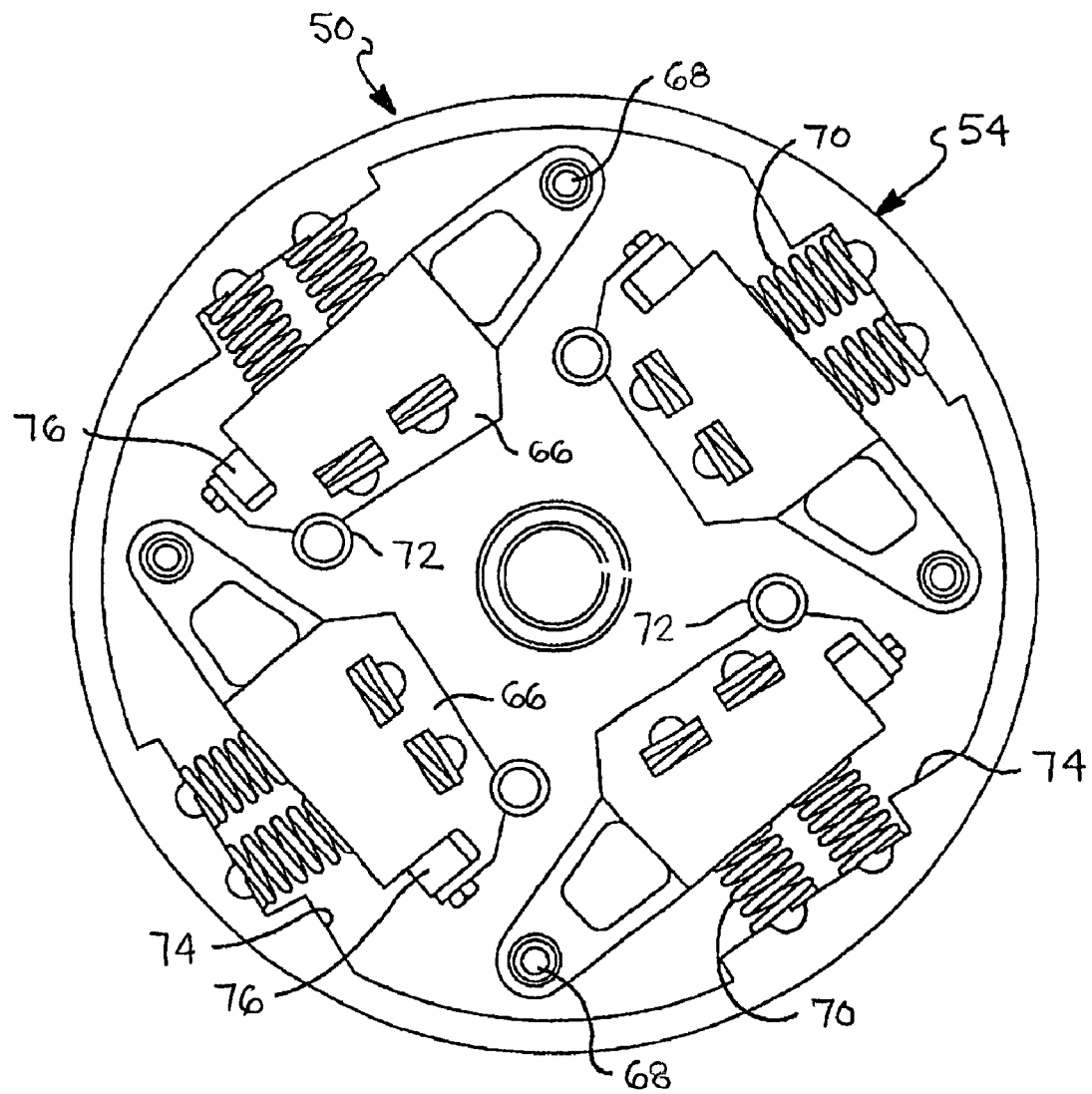
FIG. 3 is a partial top view, in section, of a cover module of the prior art clutch of FIG. 2.

To fully appreciate the features of the present invention, reference is made to a prior art centrifugal clutch 50 shown in FIGS. 2 and 3. FIG. 2 is a schematic illustration of the operational components of clutch 50 shown in fragments as rotating about a rotational axis 52 of input shaft 38. Clutch 50 includes a cover module 54 (FIG. 3), a first friction disc assembly 56, an intermediate pressure plate 58, and a second friction disc assembly 60. As is well known from conventional clutches, cover module 54 and intermediate pressure plate 58 mount to an engine flywheel 62 for rotation therewith and comprise the driving portion of clutch 50. Friction disc assemblies 56 and 60 are typically splined to transmission input shaft 38 and comprise the driven portion of clutch 50.

As shown in FIG. 3, cover module 54 includes four swing weights 66, which are movably attached to cover module 54 at pivot pins 68. Return springs 70 bias swing weights 66 radially inwardly to rest on a first stop member 72. A second stop member 74 limits the radially outward movement of swing weights 66. As engine 28 and cover module 54 rotate, the effect of centrifugal force will cause swing weights 66 to move against the biasing force of springs 70 from a position abutting stops 72 toward stops 74. Swing weights 66 each carry one or more rollers 76, which act between a reaction surface and a ramp to provide an axial clamping force for engaging clutch 50.

As shown in FIG. 2, rollers 76 are received between a substantially flat surface 78 of a fixed reaction plate 80 and a ramped surface 82 of an axially movable ramp plate 84. Ramp plate 84 acts on an axially movable main pressure plate 86 through a preloaded spring member 88, which limits the axial force applied to the main pressure plate 86 by ramp plate 84. Main pressure plate 86 applies a clamping force CF on friction pads 90 of the friction plates, which are trapped between surface 92 of main pressure plate 86 and intermediate pressure plate 58 and between intermediate pressure plate 58 and surface 94 of engine flywheel 62. Hub portions 96 of friction plates 56 and 60 are adapted to be splined to input shaft 38 for rotation therewith while plates 80, 84, 86, and 58 rotate with engine flywheel 62. Clutch 50 also includes an adjustment mechanism 97 for modifying the axial position of reaction plate 80 to accommodate wear in friction pads 90 and, accordingly, maintain a more consistent engagement point.

At rest, rollers 76 will engage a recessed portion 98 of ramp surface 82 and will not apply a leftward axial clamping force to friction pads 90. As rollers 76 travel sufficiently radially outwardly, and onto a ramped portion 100 of ramp surface 82, an increasing axial clamping force is applied. As rollers 76 move further radially outwardly onto a flat extended portion of 102 of ramp surface 82, the clamping force will remain at a capped value as limited by preloaded spring member 88. The swing weights 66 will hit stops 74 prior to full compression of springs 70.

As wear occurs in friction pads 90, rollers 76 will be required to travel farther up ramped portion 100 to apply a given clamp load during clutch engagement. This wear, and the corresponding increased outward movement in swing weights 66, causes the engagement point of clutch 50 to change due to the increased compression of biasing springs 70.

As the centrifugal force increases and overcomes the preload of spring member 88, swing weights 66 will move from ramped portion 100 onto the relatively flat extended portion 102 of surface 82. Once on flat extended portion 102, clutch 50 can transmit a given torque at a lower engine speed without the swing weights 66 traveling back down ramped portion 100. This feature is desired in commercial vehicles due to the high torque demand at relatively lower engine speeds. Because clutch 50 operates based on a balance of forces, any tolerance in the springs, compression of the springs or the dimensions of surfaces 100, 102, for example, may cause one or more of swing weights 66 to prematurely move from flat extended portion 102 onto ramped surface 100, resulting in a staggered disengagement of swing weights 66. The following table illustrates the effects of a staggered disengagement on an exemplary implementation of the prior art centrifugal clutch that includes four (4) swing weights:

TABLE 1

| | | |
|---|---|---|
| Number of Swing Weights Engaged | 4 | 3 |
| Number of Swing Weights Disengaged | 0 | 1 |
| Load On All Swing Weights (Lbf) | 3820 | 3157 |
| Load On Each Disengaged Swing Weight (Lbf) | 0 | 292 |
| Load On Each Engaged Swing Weights (Lbf) | 955 | 955 |
| Additional Return Force Applied To Engaged Swing Weight (Lbf) | 0 | 0 |

As shown in the Table 1, when swing weights 66 are engaged, the load on all of the swing weights 66 collectively is about 3820 Lbf. In the above example, since there are four swing weights, the load on each engaged swing weight 66 is about 955 Lbf (3820 Lbf/4 engaged swing weights). If one of the swing weights 66 prematurely disengages from the generally flat surface 102 of ramp surface 82 and moves onto ramped portion 100 of ramp surface 82, the disengaged swing weight 66 is subjected to a lesser load than the engaged swing weights (e.g., 292 Lbf) since there is still some centrifugal force acting on the swing weight positioned on ramped portion 100. Because return springs 70 act on each swing weight 66 individually, there is generally no additional return force imposed on each of the remaining engaged swing weights. In other words, the load on each engaged swing weight remains at about 955 Lbf (3157 Lbf-292 Lbf/3 engaged swing weights). Thus, in clutch 50, there is generally no additional return force applied to the remaining engaged swing weights after one or more of the swing weights prematurely disengage.

An improved centrifugal clutch 30 according to an embodiment of the present invention is shown in FIGS. 4–12. In an embodiment, clutch 30 includes a cover module 110, a first friction disc assembly 112, an intermediate pressure plate 114, and second friction disc assembly 116. Cover module 110 and intermediate pressure plate 114 mount to an engine flywheel for rotation therewith and comprise the driving portion 34 of clutch 30. Friction disc assemblies 112 and 116 are splined to transmission input shaft 38 and comprise the driven portion 36 of clutch 30.

As shown in FIGS. 4–7, cover module 110 includes a plurality of movable roller weights 118, which are positioned between a fixed reaction plate 120 and a ramp plate 122. In an embodiment, cover module 110 includes seven (7) roller weights 118 arranged circumferentially about input shaft 38; however, the number of roller weights 118 employed in clutch 30 is not limited thereto. Indeed, the number of roller weights 118 employed in clutch 30 may depend on a number of factors including, for example, the size of clutch 30, the desired clamping force and the load bearing capacity of each roller weight 118.

To minimize damage to reaction plate 120 due to engagement of roller weights 118, an optional liner plate 124 of hardened steel or other durable material may be positioned between roller weights 118 and reaction plate 120. In the embodiment shown in FIGS. 8 and 9, each roller weight 118 includes a shaft-like inner roller portion 126, a cylindrical outer roller portion 128 and a bearing 130 positioned between inner and outer roller portions 126, 128. Bearing 130 is retained between inner and outer roller portions 126, 128 by a pair of thrust washers 132 and 134, such as a Teflon™ or steel thrust washer, each of which is secured in the illustrated position by a retaining member 136, such as a snap ring. Once assembled, roller weights each exhibit a predetermined, yet substantially similar mass.

In the illustrated embodiment, bearing 130 includes a first needle bearing portion, such as a sealed heavy duty caged needle roller bearing manufactured by The Torrington Company having part number 101816, and a second needle bearing portion, such as a sealed full complement needle roller bearing manufactured by The Torrington Company having part number BH-1016. In a particular implementation of the invention, the first needle bearing portion is capable of a working load of about 2560 Lbf and a static load of about 4150 Lbf, and the second needle bearing portion is capable of a working load of about 5780 Lbf and a static load of about 10,300 Lbf. While a particular configuration of roller weight 118 has been shown and described in the illustrated embodiments, it will be appreciated that other configurations are within the scope of the present invention.

Figure 4:
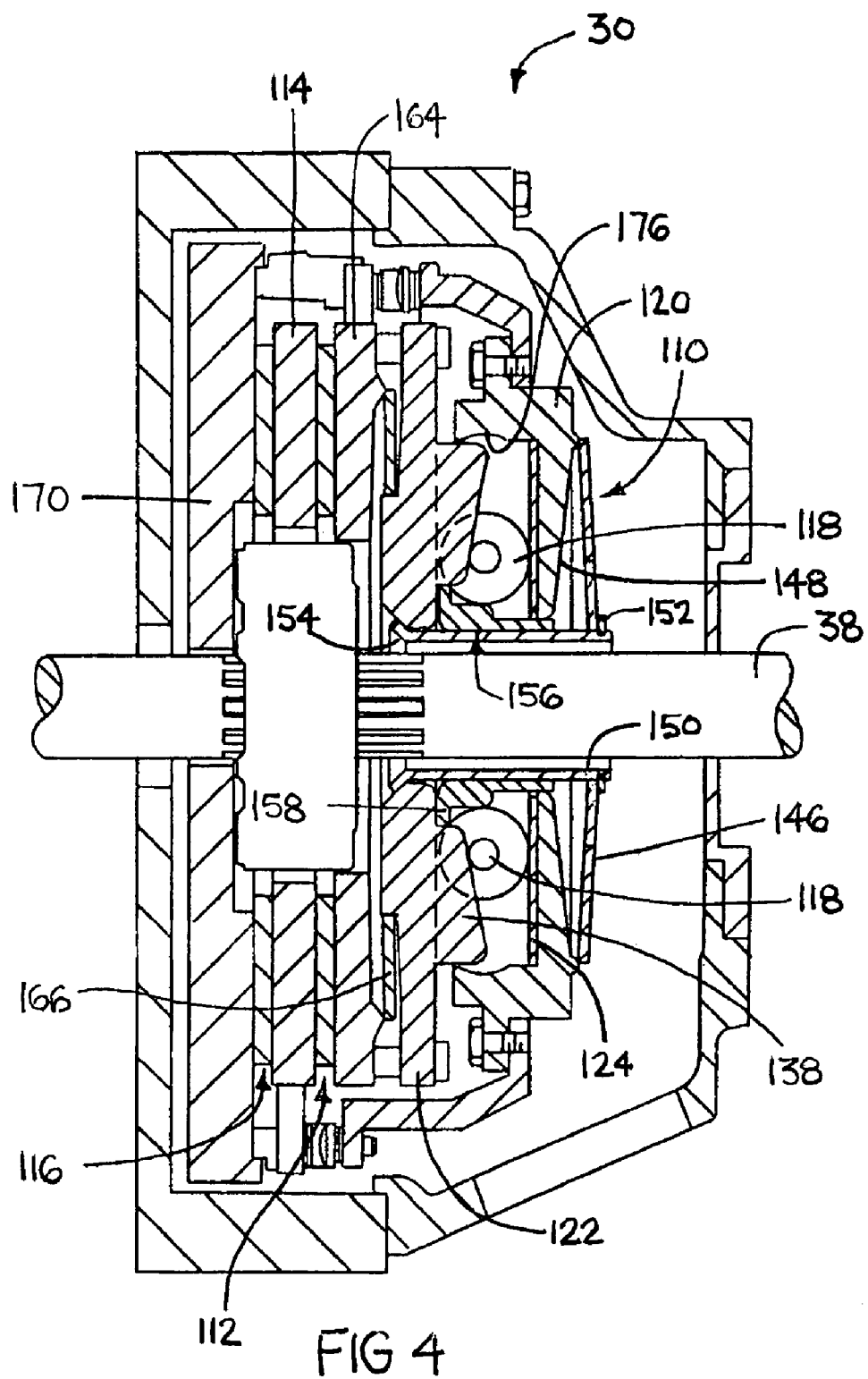
FIG. 4 is a partial cross-sectional view of a centrifugal clutch according to an embodiment of the present invention, showing the clutch in a disengaged state.
Figure 5:
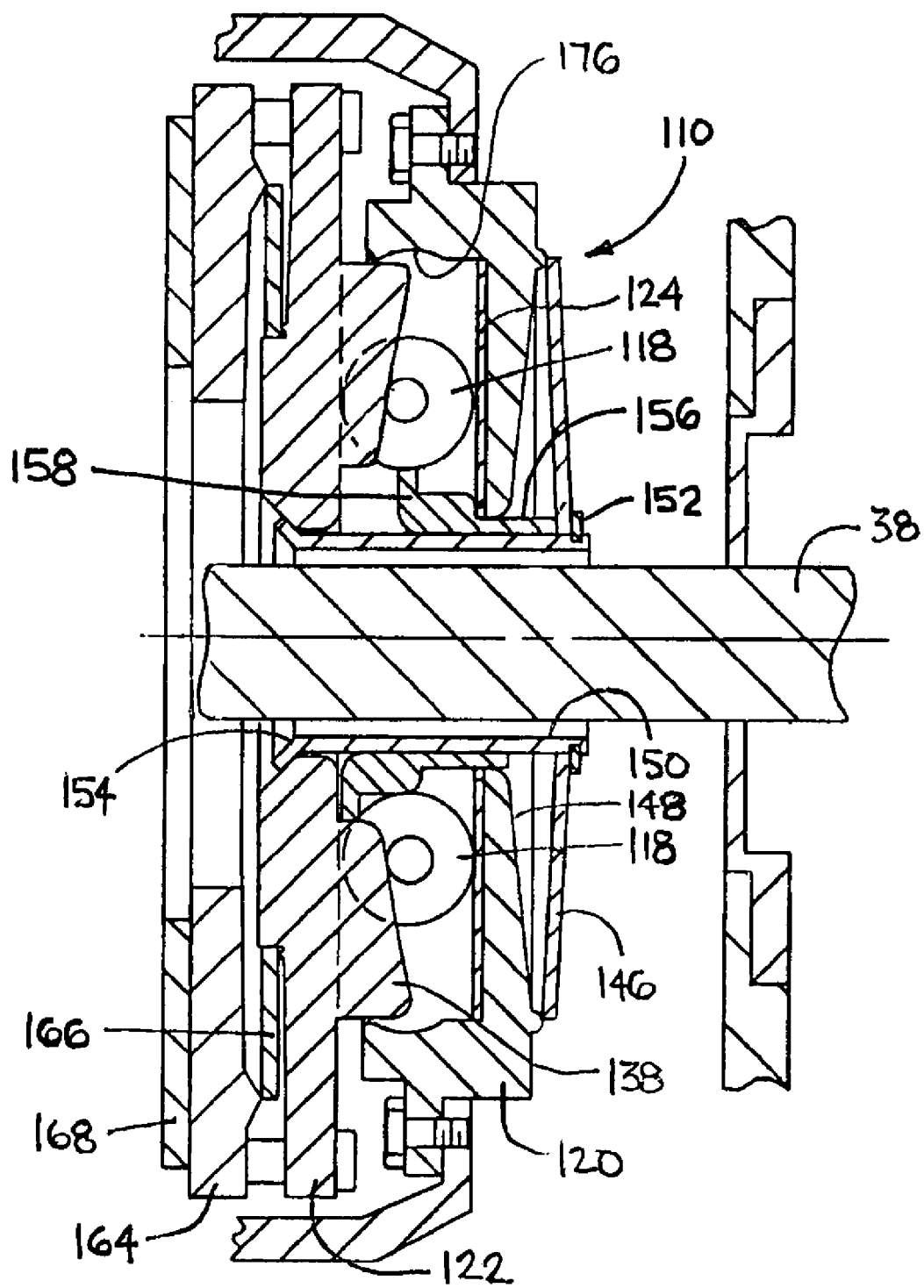
FIG. 5 is a partial cross-sectional view of the centrifugal clutch of FIG. 4, showing a top section of the clutch during installation and a bottom section of the clutch in an installed, disengaged state for comparison.
Figure 6:
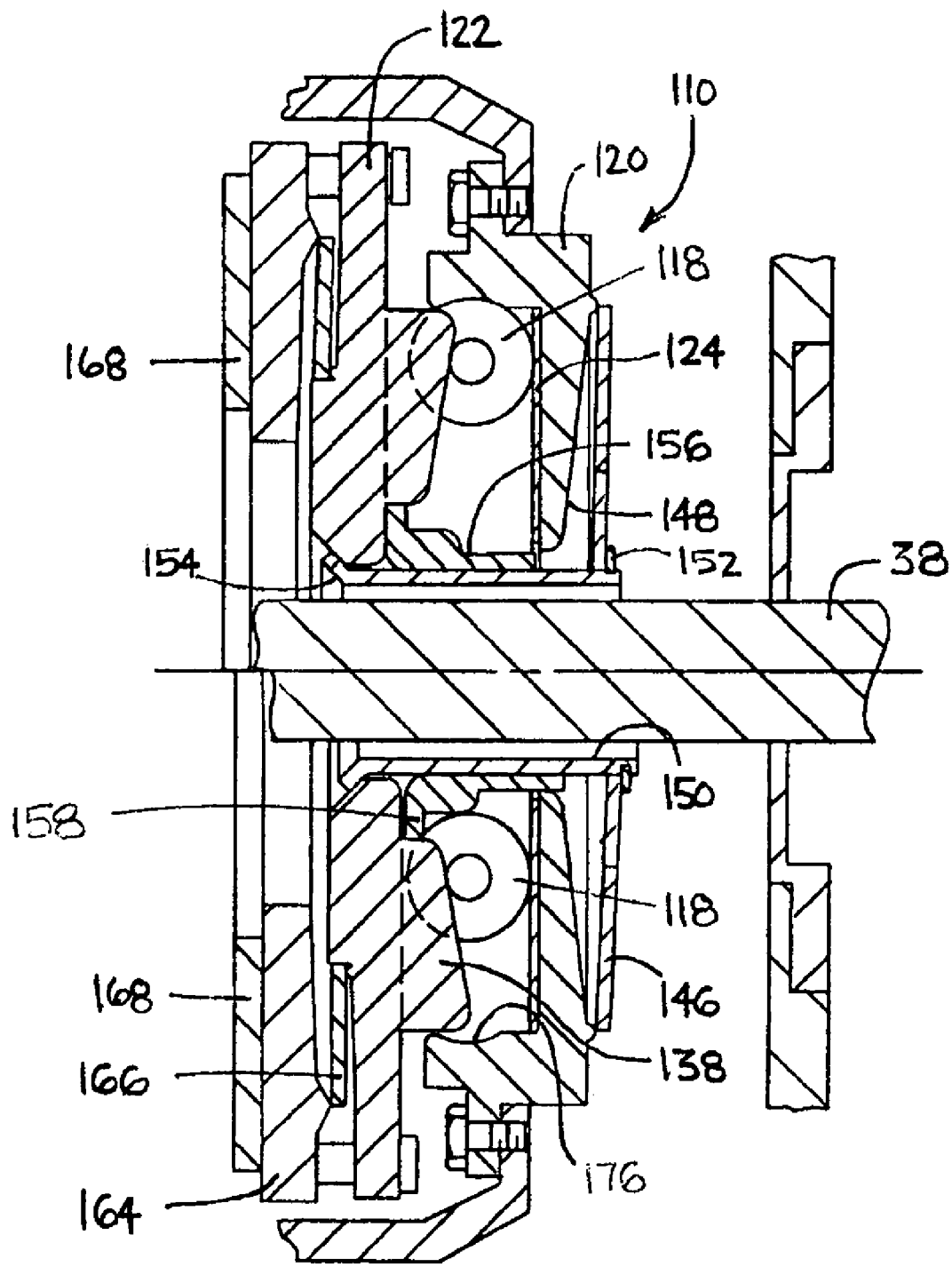
FIG. 6 is a partial cross-sectional view of the centrifugal clutch of FIG. 4, showing a top section of the clutch in an engaged state and a bottom section of the clutch in a disengaged state for comparison.
Figure 7:
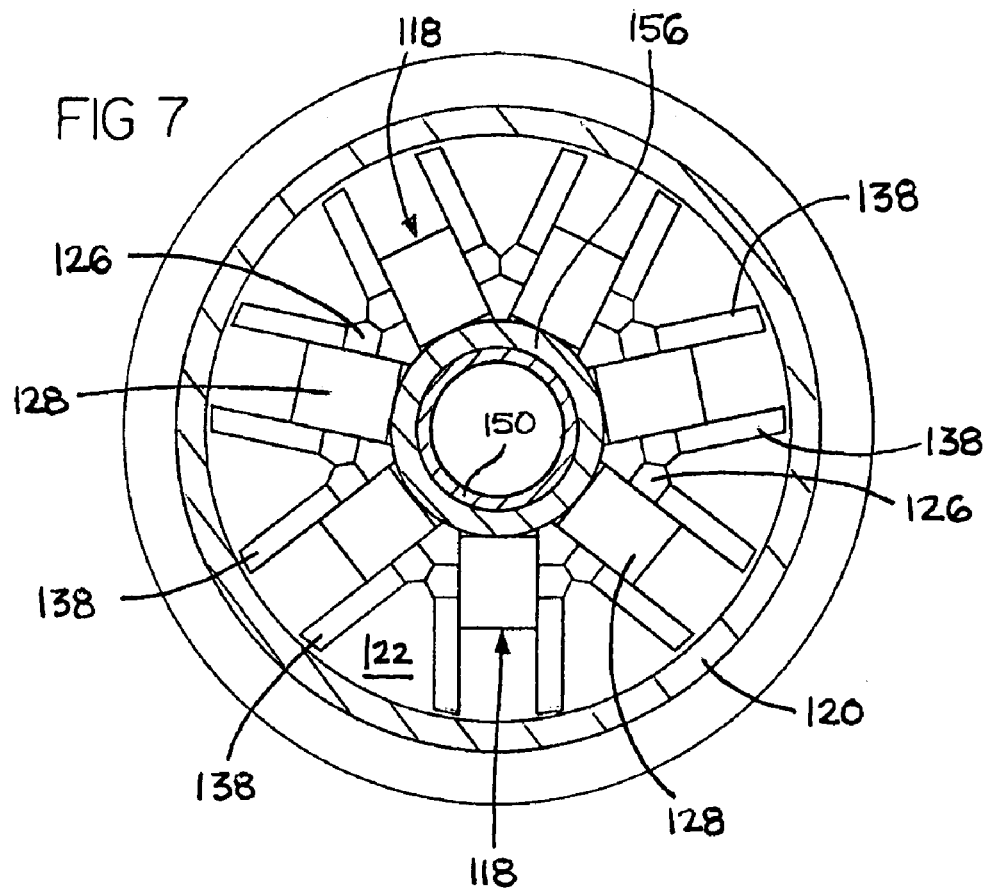
FIG. 7 is a partial top view, in section, of a cover module for the clutch of FIGS. 4–6.

As shown in FIGS. 4–6, outer roller portion 128 of each roller weight 118 engages reaction plate 120 (or the optional liner plate 124), while inner roller portion engages a ramp 138 on ramp plate 122. Each ramp 138 may be integrally formed with ramp plate 122 or, alternatively, separately formed and attached thereto. In an embodiment, each inner roller portion 126 is engaged with a pair of adjacent ramps 138 (see FIG. 7) that cooperatively support inner roller portion 126 such that outer roller portion 128 may freely roll therebetween. Each ramp 138 tapers radially outwardly and away from ramp plate 122. In a particular configuration, ramps 138 include a single ramp surface 140 that tapers radially outwardly and away from ramp plate 122 at an increasing angle with respect to the ramp plate. For example, in the embodiment shown in FIG. 10, the surface 140 of each ramp 138 tapers from about 7 degrees adjacent its radially innermost point to about 13 degrees adjacent its radially outermost point. In another configuration, ramps 138 include a first ramp surface 142 and a second ramp surface 144. In a representative embodiment shown in FIG. 11, first ramp surface 142 tapers at an increasing angle of around 10.5 degrees adjacent its radially innermost point to about 14 degrees adjacent its radially outermost point. Second ramp surface 144 tapers at an angle of about 5 degrees, which is relatively flatter than first ramp surface 142.

Unlike the prior art clutch 50 shown in FIGS. 2 and 3, clutch 30 does not use coil return springs 70 to bias roller weights 118 toward their original or "disengaged" position shown in FIG. 4. Rather, clutch 30 includes a return spring member 146, such as a diaphragm spring, which is mounted to the top of cover module 110 and engages an outer surface 148 of reaction plate 120. In an embodiment, return spring member 146 has a height to thickness ratio (H/T ratio) of about 1.5. This ratio provides for a relatively consistent spring force over a long travel of spring member 146. Return spring member 146 is held in position by a reaction member 150, such as a generally cylindrical sleeve, which surrounds input shaft 38. A first end of reaction member 150 includes a retaining member 152, such as a retaining ring, for engaging a radially inner edge of return spring member 146. A second end of reaction member 150 includes a lip 154 that engages ramp plate 122. In operation, reaction member 150 is adapted to move axially with ramp plate 122 as clutch 30 is engaged and disengaged.

The spring force of return spring member 146 will react against reaction plate 120 and pull on ramp plate 122 through reaction member 150 to return the components to their disengaged positions. In the absence of centrifugal force, this "return force" will be applied through ramps 138 and will force roller weights 118 to remain at the bottom of ramps (see FIG. 4). However, as the engine speed increases, centrifugal force will cause roller weights 118 to move radially outwardly over ramps 138 and overcome the preload of return spring member 146. As the engine speed further increases, roller weights 118 will continue up ramps 138 and will force ramp plate 122 toward first friction disc assembly 112 (see upper section of FIG. 6).

Clutch 30 may also include an installation device to facilitate installation of clutch 30 into drivetrain system 20. In an embodiment, clutch installation device includes a generally cylindrical installation member 156 rotatably and/or axially disposed in cover module 110 radially inwardly of roller weights 118. Installation member 156 includes a cam lobe 158 for engaging at least one of roller weights 118 during rotation and/or axial movement of installation member 156 relative to cover module 110. Movement of cam lobe 158 forces the engaged roller weight 118 to roll outward and, accordingly, modify the position of the pressure plate, such that, when the cover module 110 is secured to the engine flywheel, the pressure plate provides a clamping force against friction disc assemblies 112 and 116 to inhibit movement thereof. Installation devices similar to that shown and described may be seen by reference to U.S. Pat. No. 6,609,602, which is owned by the assignee of the present invention and incorporated herein by reference in its entirety.

Figure 12:
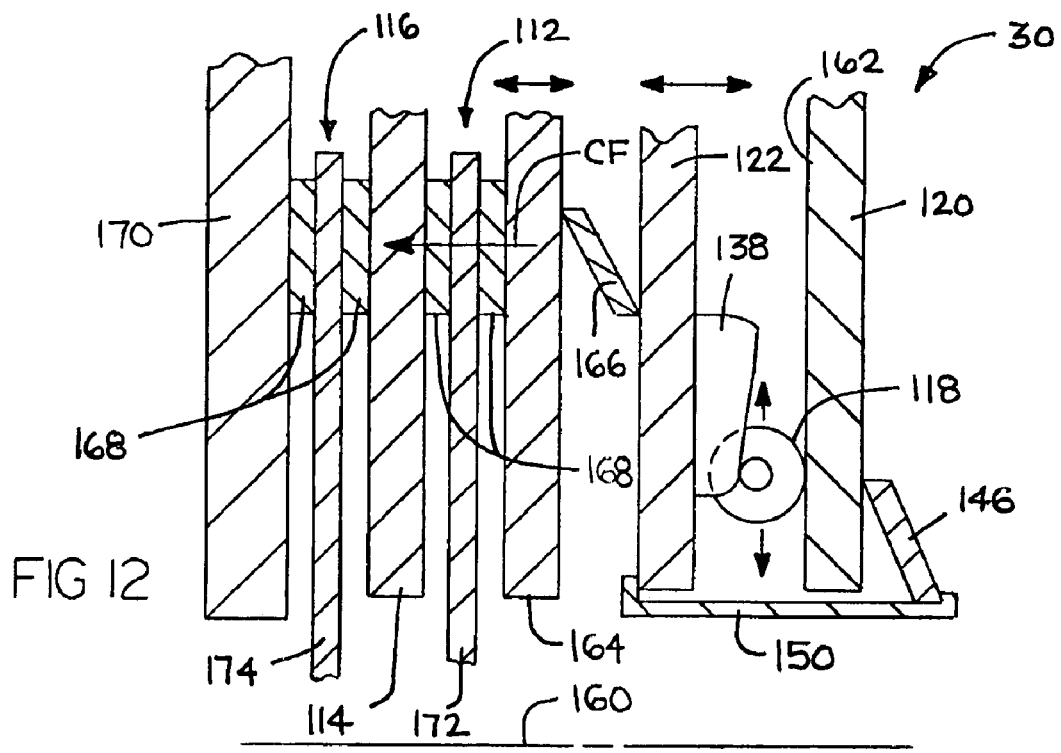
FIG. 12 is a schematic partial sectional view of a centrifugal clutch according to an embodiment of the present invention.

FIG. 12 is a schematic illustration of the operational components of clutch 30 shown in fragments as rotating about the rotational axis 160 of input shaft 38. As shown in FIG. 12, roller weights 118 are received between a substantially flat surface 162 of fixed reaction plate 120 and ramps 138 of the axially movable ramp plate 122. Ramp plate 122 acts on an axially movable main pressure plate 164 through a preloaded plate spring member 166, such as a diaphragm spring, which limits the axial force applied to main pressure plate 164 by ramp plate 122. Main pressure plate 164 will apply a clamping force CF on friction pads 168 of friction disc assemblies 112 and 116, which are trapped between main pressure plate 164 and intermediate pressure plate 114 and between intermediate pressure plate 114 and an engine flywheel 170. Hub portions 172 and 174 of friction disc assemblies 112 and 116, respectively, are adapted to be splined to input shaft 38 for rotation therewith while plates 120, 122, 164, and 114 rotate with engine flywheel 170.

Figure 15:
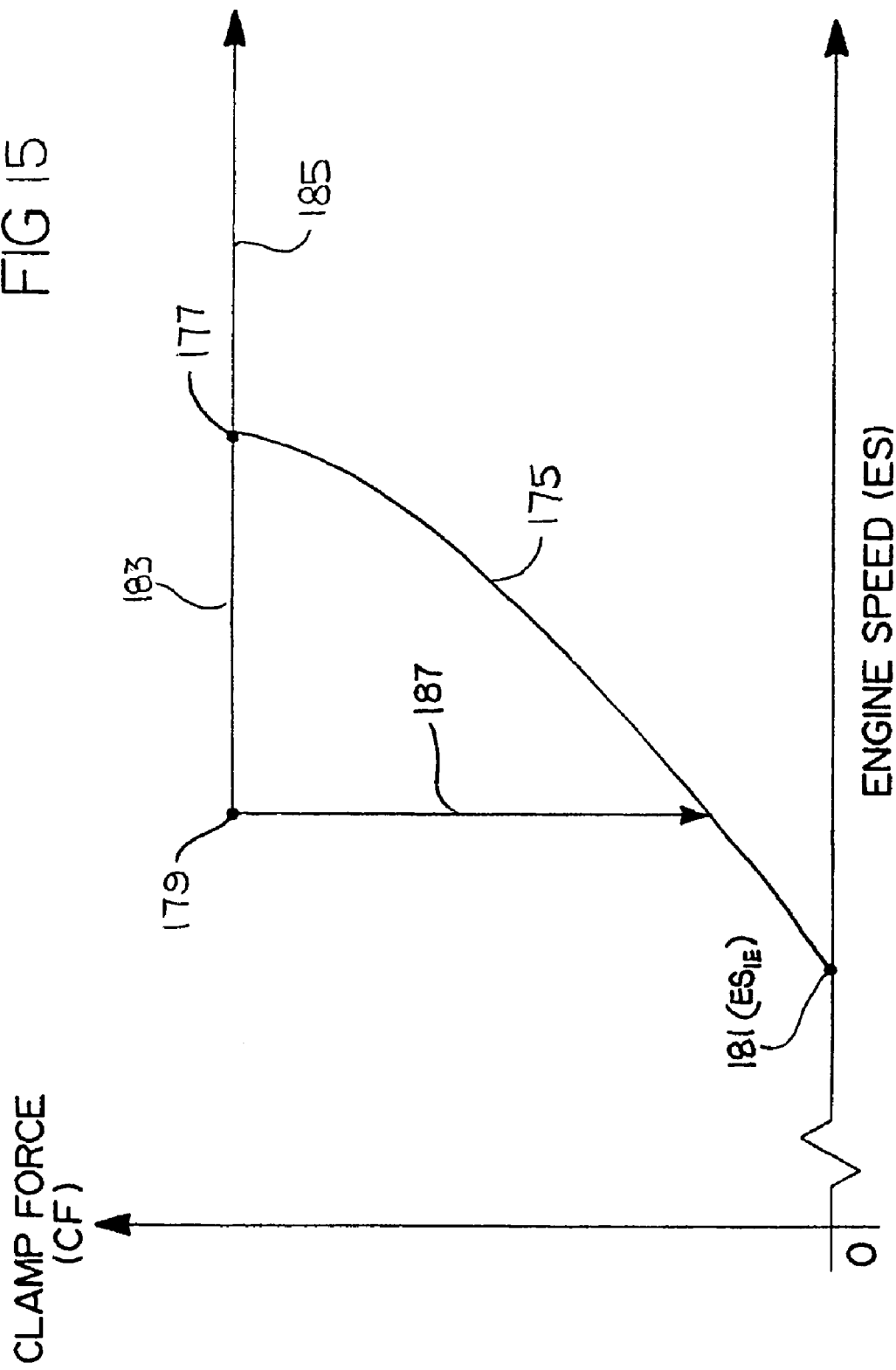
FIG. 15 is a schematic illustration, in graphical format, of the clamp force characteristics of a centrifugal clutch according to another embodiment of the present invention at various engine speeds.

In a disengaged state, roller weights 118 will engage the radially innermost portion of ramps 138 and will not apply a leftward axial clamping force to friction pads 168. Spring members 146, 166 bias roller weights 118 radially inwardly to rest on installation member 156 (see FIG. 4). The biasing force of return spring member 146 is applied through reaction member 150 which pulls on ramp plate 122 in a direction toward the fixed reaction plate 120. As engine flywheel 170 and cover module 110 rotate, the effect of centrifugal force will cause roller weights 118 to move against the biasing force of return spring member 146 from the disengaged position shown in the lower section of FIG. 6 toward the engaged position shown in the upper section of FIG. 6. As the engine speed increases, roller weights 118 travel radially outwardly and an increasing axial clamping force is applied (see line 175 on FIG. 15). A radially inwardly facing surface 176 of reaction plate 120 limits the radially outward movement of roller weights 118 (see FIG. 6).

The return spring force applied by spring members 146, 166 is independent of roller weight position. Like the prior art clutch 50, clutch 30 of the present invention functions based on a balance of forces. However, unlike the prior art clutch 50, the return spring force imposed by spring members 146, 166 in clutch 30 acts through all of roller weights 118. If one or more roller weights 118 prematurely disengages before the other roller weights, the return force that was applied to the prematurely disengaged roller weight will be transferred to the remaining engaged rollers weights. This configuration provides additional return force to move the remaining roller weights 118 down ramps 138, which disengages clutch 30 with less stagger of the individual roller weights 118. In the prior art clutch 50, the return spring force on a prematurely disengaged swing weight 66 is not applied to remaining engaged swing weights since each swing weight is biased by its own return spring(s).

Among other benefits, clutch 30 is inherently configured for extended wear life and exhibits a relatively consistent engagement point without the need for an adjustment system. These benefits are realized by properly configuring the ramp angle(s) and the spring load of return spring member 146. Particularly, the return spring force provided by return spring member 146 acts through ramps 138 on ramp plate 122. As roller weights 118 move progressively outward toward surface 176 of reaction plate 120 due to wear in friction pads 168, roller weights 118 create additional clamping force. To compensate for this increased clamping force so that a consistent engagement point is achieved, the spring load of return spring member 146 may be progressively increased or the angle of ramps 138 may be progressively increased-either of which will increase the return force on roller weights 118 and resist radial outward movement of roller weights 118. As will be appreciated, progressively increasing the angle at which ramps 138 taper, as shown in FIG. 10, will extend the wear life of the clutch assembly and provide for a relatively consistent engagement point without the need for the adjustment device required by the prior art.

Figure 10:
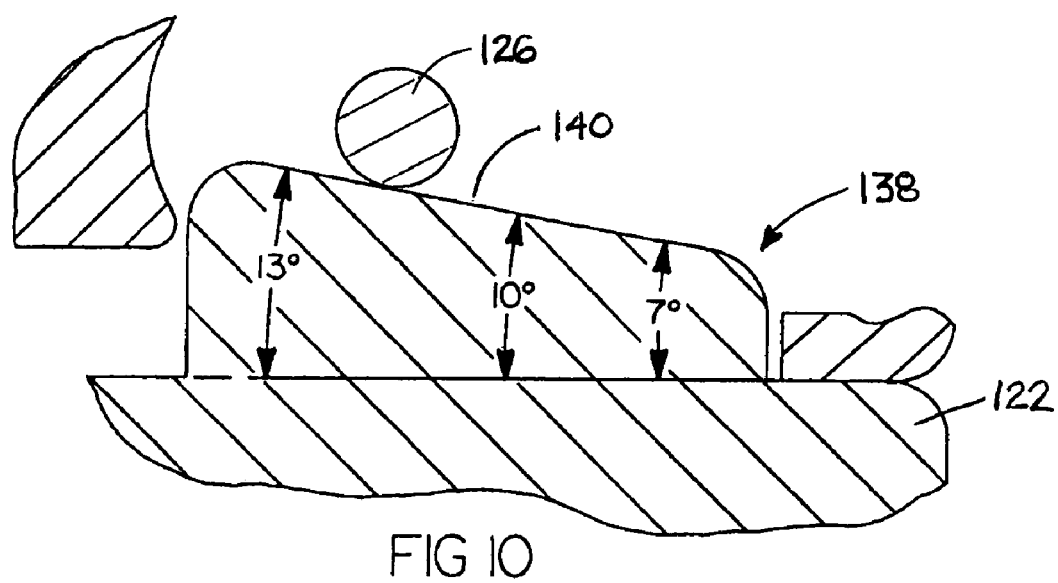
FIG. 10 is detailed cross-sectional view of a ramp according to an embodiment of the present invention.
Figure 8:
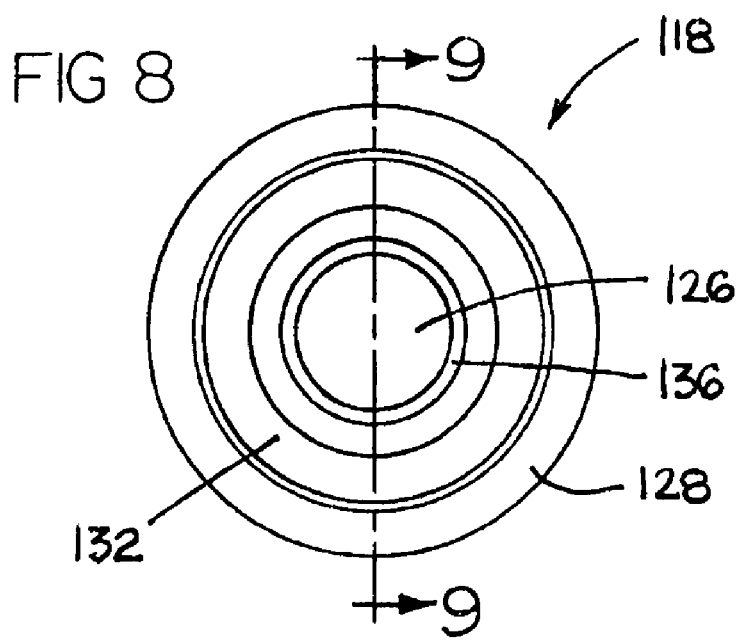
FIG. 8 is a side elevation view of a roller weight according to an embodiment of the present invention.
Figure 9:
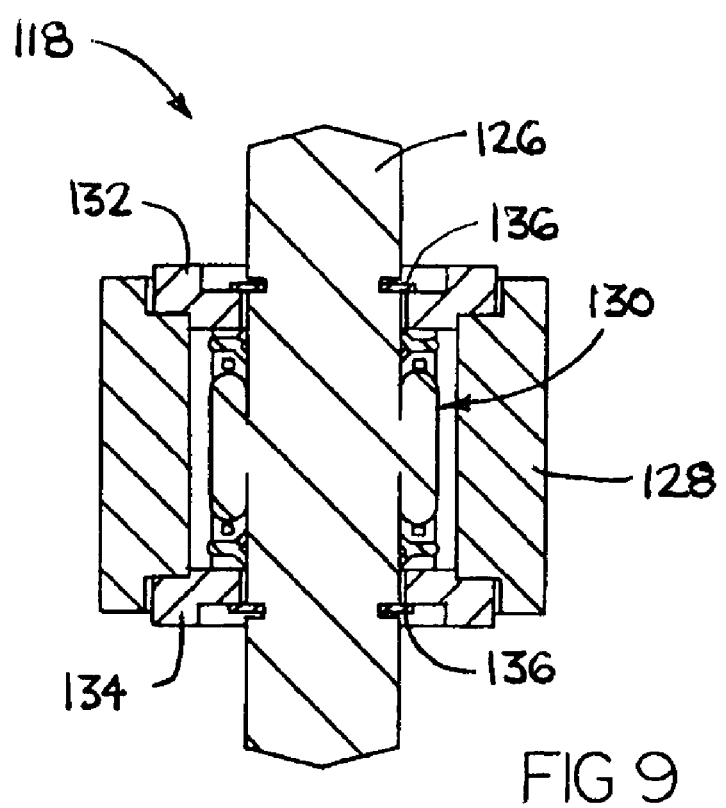
FIG. 9 is a cross-sectional view of the roller weight of FIG. 8.
Figure 13:
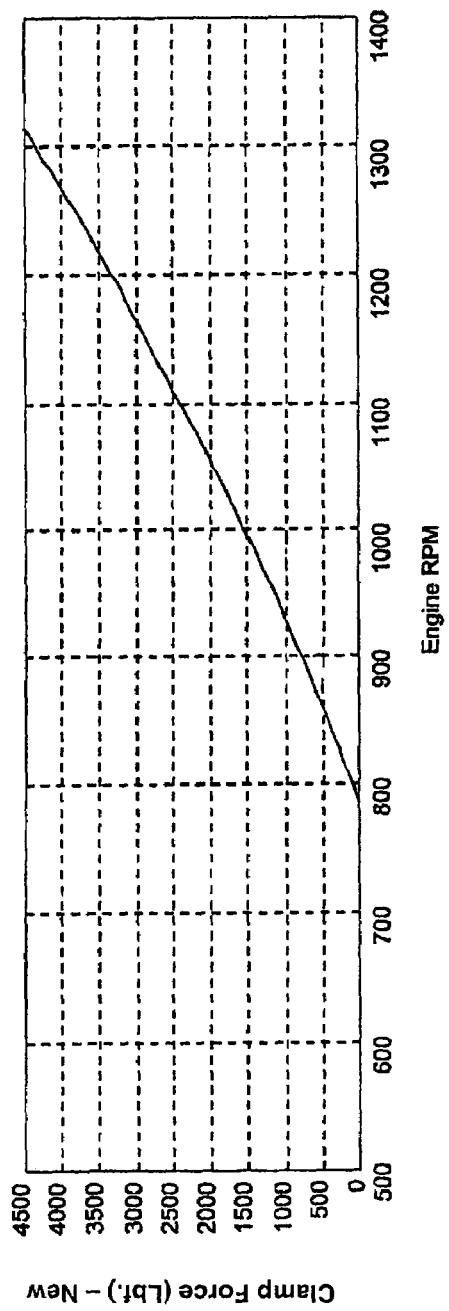
FIG. 13 is a schematic illustration, in graphical format, of the clamp force characteristics of a new centrifugal clutch according to an implementation of the present invention at various engine speeds.
Figure 14:
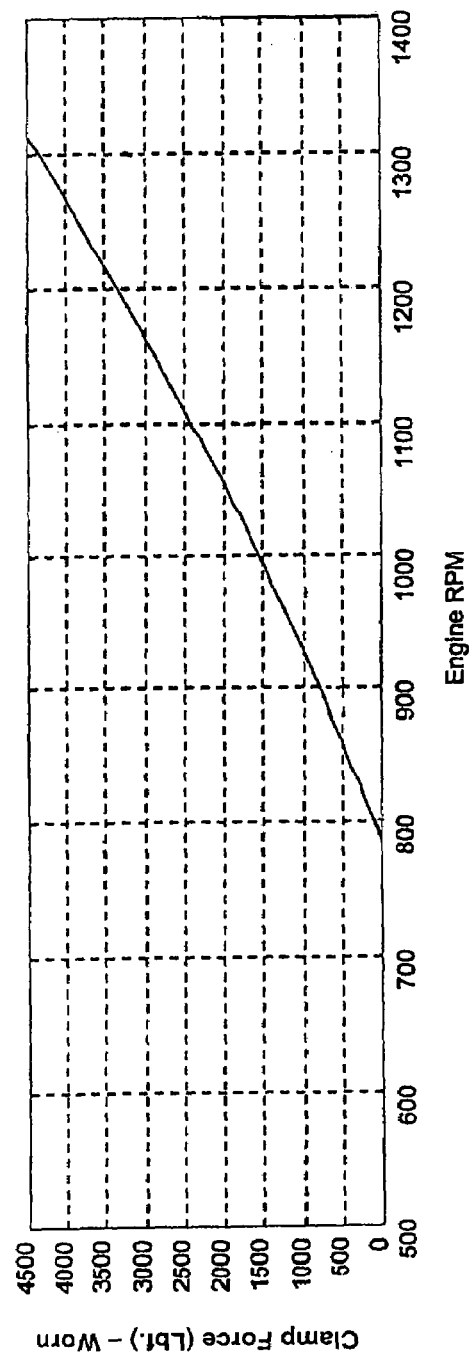
FIG. 14 is a schematic illustration, in graphical format, of the clamp force characteristics of the centrifugal clutch of FIG. 13 with worn friction facings.

FIGS. 13 and 14 illustrate the effect of wear on the clamp force produced by clutch 30 configured with ramps 138 shown in FIG. 10. FIG. 13 schematically illustrates the clamp force produced by a new clutch 30 as the engine speed increases and FIG. 14 schematically illustrates the clamp force produced by clutch 30 with worn friction pads 168 (on the order of about 0.250 inches of wear). The clamp force produced by clutch 30 with worn friction pads is virtually identical to the clamp force produced by the new clutch 30.

Figure 11:
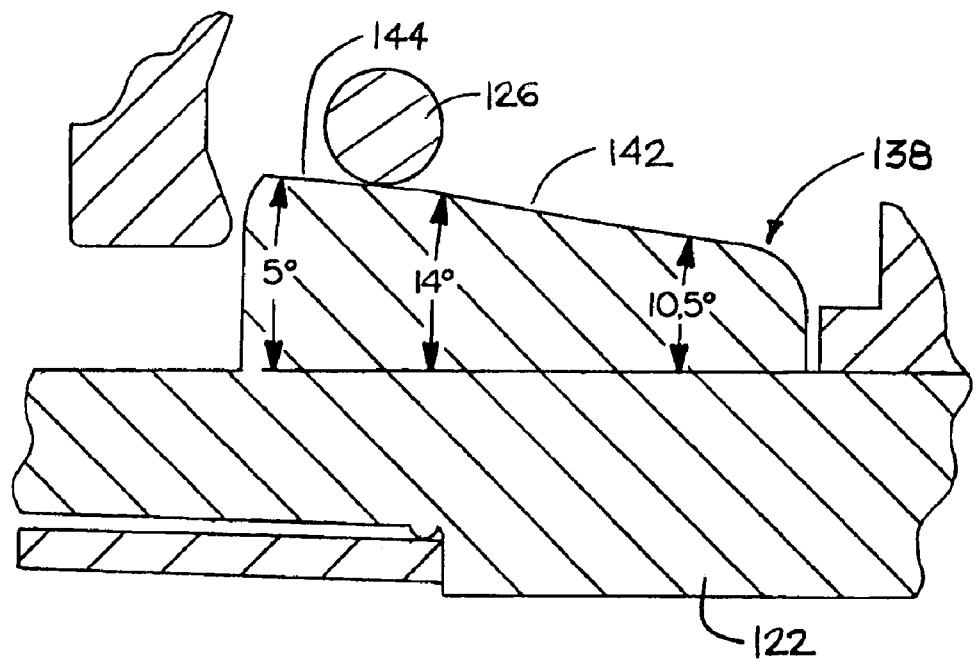
FIG. 11 is a is a detailed cross-sectional view of a ramp according to another embodiment of the present invention.

In addition to the benefits described above for the embodiment of ramps 38 shown in FIG. 10, additional benefits are realized with the embodiment of ramps 138 shown in FIG. 11. As engine speed is increased, roller weights 118 create a radial force that is transferred into a clamping force on ramps 138 as the roller weights move up first ramp surface 142 of ramps 138. As the clamping force reaches the preload of plate spring member 166, the axial force imposed on ramp plate 122 by outward movement of roller weights 118 will overcome the preload of plate spring member 166 and compress plate spring member 166. When plate spring member 166 is compressed, roller weights 188 will continue to move radially outward onto second ramp surface 144 of ramps 138, which is flatter that first ramp surface 142. A greater centrifugal force is required to move roller weights 118 up first ramp surface 142 of ramps 138 and onto second ramp surface 144 than is required to retain roller weights 118 on second ramp surface 142 against the effect of the spring force imposed by spring members 146, 166. This accounts for the difference between the initial maximum clamping force engine speed value, point 177 in FIG. 15, and the release engine speed value, point 179 in FIG. 15.

Once clutch 30 is engaged, roller weights 118 are positioned on second surface 144 of ramps 138 and spring members 146, 166 are compressed, the return spring force generated by spring members 146, 166 is exerted on ramps 138 and roller weights 118 generally parallel to axis 160. Both of these spring forces will act on roller weights 118 during disengagement to form a combined return spring force. During disengagement of clutch 30, the engine speed is decreased and roller weights 118 will move from second ramp surface 144 of ramps 138 to first ramp surface 142. If one or more of roller weights 118 disengages (i.e., moves from second ramp surface 144 to first ramp surface 142) before the remaining roller weights 118, the return spring force acting on all of the roller weights before disengagement is transferred to the remaining engaged roller weights 118. Since there are fewer roller weights remaining on second ramp surface 144, there is greater return force acting on each individual engaged roller weight 118, which moves the remaining roller weights 118 from second ramp surface 144 to first ramp surface 142. Once a roller weight 118 moves from second ramp surface 144 to first ramp surface 142, there is a significantly reduced return spring force acting on that roller weight. This feature provides for a quieter disengagement of clutch 30 since there is no longer a significant return spring force acting on the disengaged roller weight to force the roller weight to impact installation member 156. This feature is in contrast to the prior art swing weight 66, which is continuously acted upon by the return spring force of coil springs 70 as the swing weight moves from surface 102 of ramp plate 82 to surface 98 and impacts stop 72.

In a particular implementation of the present invention, first ramp surface 142 of ramps 138 exhibits a 10.5 degree ramp angle at a distance of approximately 3.3 inches from axis 160 and a 14 degree ramp angle at a distance of approximately 4.5 inches from axis 160. Second ramp surface 144 of ramps 138 exhibits a 5 degree ramp angle at a distance of greater than about 4.5 inches from axis 160. Return spring member 146 exhibits a spring load of approximately 2300 Lbf and plate spring member 166 exhibits a spring load of approximately 3500 Lbf. Additionally, various return straps (not shown) utilized to bias intermediate plate pressure plate 114 toward a disengaged position exhibit a combined spring load of about 175 Lbf. These angles and forces are approximate and it will be appreciated that slight variations are permissible given the features of the present invention. Thus, tolerances in the components are not as critical as they are in the prior art clutch 50.

In the described implementation, the approximate load on roller weights 118 as clutch 30 transitions between various states of operation is as follows:

TABLE 2

| Clutch State | Position of Roller Weights | Load On All Roller Weights/Load on Each Roller Weight |
| --- | --- | --- |
| Clutch Disengaged - Touch Point | 10.0 degree ramp portion of first ramp surface at a distance of about 2.9 inches from axis 160. | 2300 Lbf/328 Lbf |
| Touch Point | 10.5 degree ramp portion of first ramp surface 142 at a distance of about 3.3 inches from axis 160. | 2475 Lbf/353 Lbf |
| Clutch Fully Engaged | Second ramp surface 144 at a distance of about 4.8 inches from axis 160. | 5975 Lbf/854 Lbf |

In the described implementation, system 20 is a heavy duty truck drivetrain, engine 28 is an electronically controlled diesel engine having an idle speed of about 600 RPM to 700 RPM, and a governed top speed of about 1800 RPM to 2000 RPM. Clutch 30 will move to incipient engagement at about 800 RPM, point 181 ($ES_{IE}$), which is slightly above idle, and will have an increasing clamp load, line 175, as engine speed increases. Clutch 30 will be fully engaged at or below a capped maximum clamp force, 5975 pounds, at about 1400 RPM, point 177. Once at maximum clamp load, which is selected to lock-up clutch 30 under extreme conditions (i.e., substantially zero slip at considerably greater than expected torque loads), clutch 30 will remain locked-up, lines 183 and 185, until the engine speed becomes less than about 970 RPM, point 179. At the release point, clutch 30 will very rapidly disengage with decreasing engine speed, line 187, to prevent engine stalling.

In the fully engaged state of the above described implementation of clutch 30, the centrifugal force acting on each roller weight 118 is at least about 151 Lbf at an engine speed of about 967 RPM (which defines the line between engagement and disengagement of clutch 30). When the engine speed drops below about 967 RPM, roller weights 118 will move from second ramp surface 144 of ramp 138 to first ramp surface 142. Due to manufacturing tolerances in the clutch components, one or more roller weights 118 may prematurely move from second ramp surface 144 to first surface 142 before the remaining roller weights make the transition, resulting in a staggered disengagement of clutch 30. As noted above, tolerances in the components are not as critical to the present invention given the discussed features of clutch 30 with respect to load redistribution. Table 3 below illustrates the various forces applied to roller weights 118 as one or more roller weights 118 prematurely transitions from second ramp surface 144 to first ramp surface 142 during disengagement of clutch 30.

TABLE 3

| | | |
|---|---|---|
| Number of Roller Weights Engaged | 7 | 6 |
| Number of Roller Weights Disengaged | 0 | 1 |
| Load On All Roller Weights (Lbf) | 5975 | 5975 |
| Load On Each Disengaged Roller Weight (Lbf) | 0 | 607 |
| Load On Each Engaged Roller Weight (Lbf) | 854 | 894 |
| Additional Return Force Per Engaged Roller Weight (Lbf) | 0 | 40 |

As shown in Table 3, the load on all of roller weights 118 collectively, due to the return roller force generated by roller members 146, 166 and the return strap force, is the same regardless of whether one or more of roller weights 118 prematurely disengage. In an embodiment, since there are seven roller weights, the load on each engaged roller weight is about 854 Lbf (5975 Lbf/7 engaged roller weights) when all of the roller weights 118 are engaged. If one of roller weights 118 prematurely disengages from second ramp surface 144 and moves onto first ramp surface 142, the disengaged roller weight is subjected to a lesser load than the engaged roller weights (e.g., 607 Lbf.) since there is still some centrifugal force acting on the roller weight on first ramp surface 142. Because the return spring force generated by spring members 146, 166 and the return strap load act on the engaged roller weights collectively, instead of individually as in the prior art clutch 50, there is additional return force imposed on each of the remaining engaged roller weights 118. In other words, the load on each remaining engaged roller weight 118 increases from about 854 Lbf to about 894 Lbf (5975 Lbf-607 Lbf/6 engaged roller weights). Thus, in the above embodiment, there is an additional 40 Lbf per roller weight 118 acting to force the remaining engaged roller weights 118 off the second ramp surface 144.

In the prior art swing weight clutch 50, the load on each engaged swing weight 66 remains the same, even as the one or more of its adjacent swing weights 66 prematurely disengages (see Table 1). However, in clutch 30 of the present invention, the load on each roller weight 118 increases as one or more of its adjacent roller weights 118 prematurely disengages (see Table 3). Therefore, unlike the prior art, the additional load acting on each engaged roller weight 118 will force the remaining roller weights 118 to move from second ramp surface 144 to first ramp surface 142, resulting in a more consistent disengagement of clutch 30.

As will also be appreciated, a greater number of roller weights 118 may be used in the clutch of the present invention, particularly when compared to the prior art clutch 50. This feature is due in part to the more compact package exhibited by roller weights 118 as compared to swing weights 66. In the embodiment of the invention shown in FIG. 7, a total of seven (7) roller weights were employed compared to four (4) swing weights used in the prior art clutch 50, which is of comparable size to clutch 30 of the present invention. Because of the additional roller weights, a higher plate load is available for clutch 30 when compared to prior art clutch 50.

Figure 16:
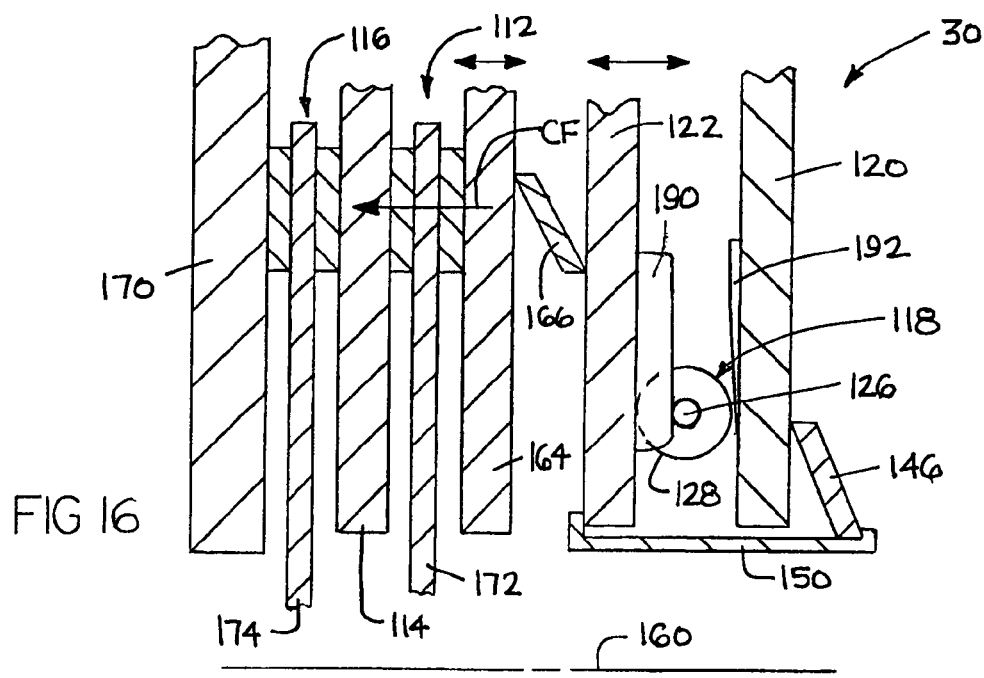
FIG. 16 is a schematic partial sectional view of a centrifugal clutch according to another embodiment of the present invention.

Referring to FIG. 16, another embodiment of the invention is shown. In the illustrated embodiment, axial moveable plate 122 (ramp plate 122 in the embodiment of FIG. 12) includes a plurality of relatively flat support members 190 that are positioned to support inner roller portions 126 of roller weights 118 in a manner similar to ramps 138. Additionally, fixed plate 120 (reaction plate 120 in the embodiment of FIG. 12) includes a plurality of ramps 192 positioned to engage outer roller portion 128 of roller weights 118. Ramps 192 may be formed with fixed plate 120 or separately formed and attached thereto.

Ramps 192 may be configured with a single ramped surface or a pair of ramped surfaces, each of which is substantially similar in configuration to the ramped surfaces illustrated in FIGS. 10 and 11. Particularly, ramps 192 may include a single ramped surface tapering radially outwardly and away from fixed plate 120 at an increasing angle with respect to the fixed plate. Alternatively, ramps 192 may include first and second ramp surfaces that taper radially outwardly and away from fixed plate 120 at different angles with respect to the fixed plate. In contrast to the embodiment of clutch 30 shown FIG. 12, fixed plate 120 functions as a fixed ramp plate and the axially movable plate 122 functions as an axial movable reaction plate. Thus, as roller weights 118 move outwardly under the effects of centrifugal force, outer roller portion 128 of roller weights 118 rolls over ramps 192, causing inner roller portion 126 to react against support members 190 and thereby move plate 122. Further operation of the embodiment of clutch 30 shown in FIG. 16, and the function of its components beyond the differences described herein, is substantially similar to that described above in reference to FIG. 12 and will not be described in further detail.

Figure 18:
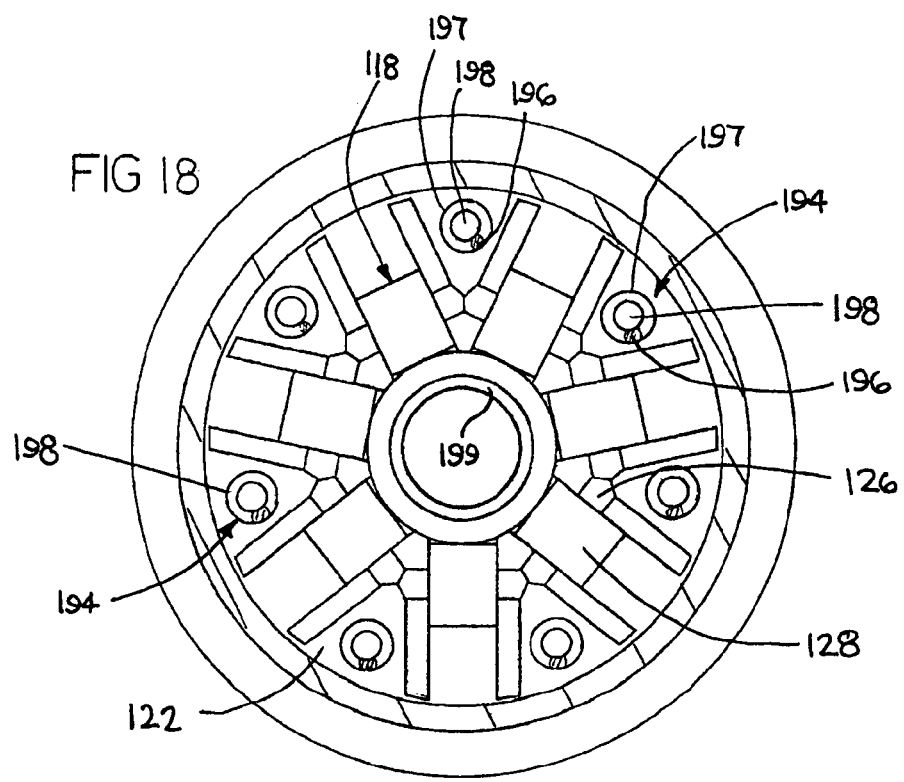
FIG. 18 is a partial top view, in section, of a cover module for the clutch of FIG. 17.
Figure 17:
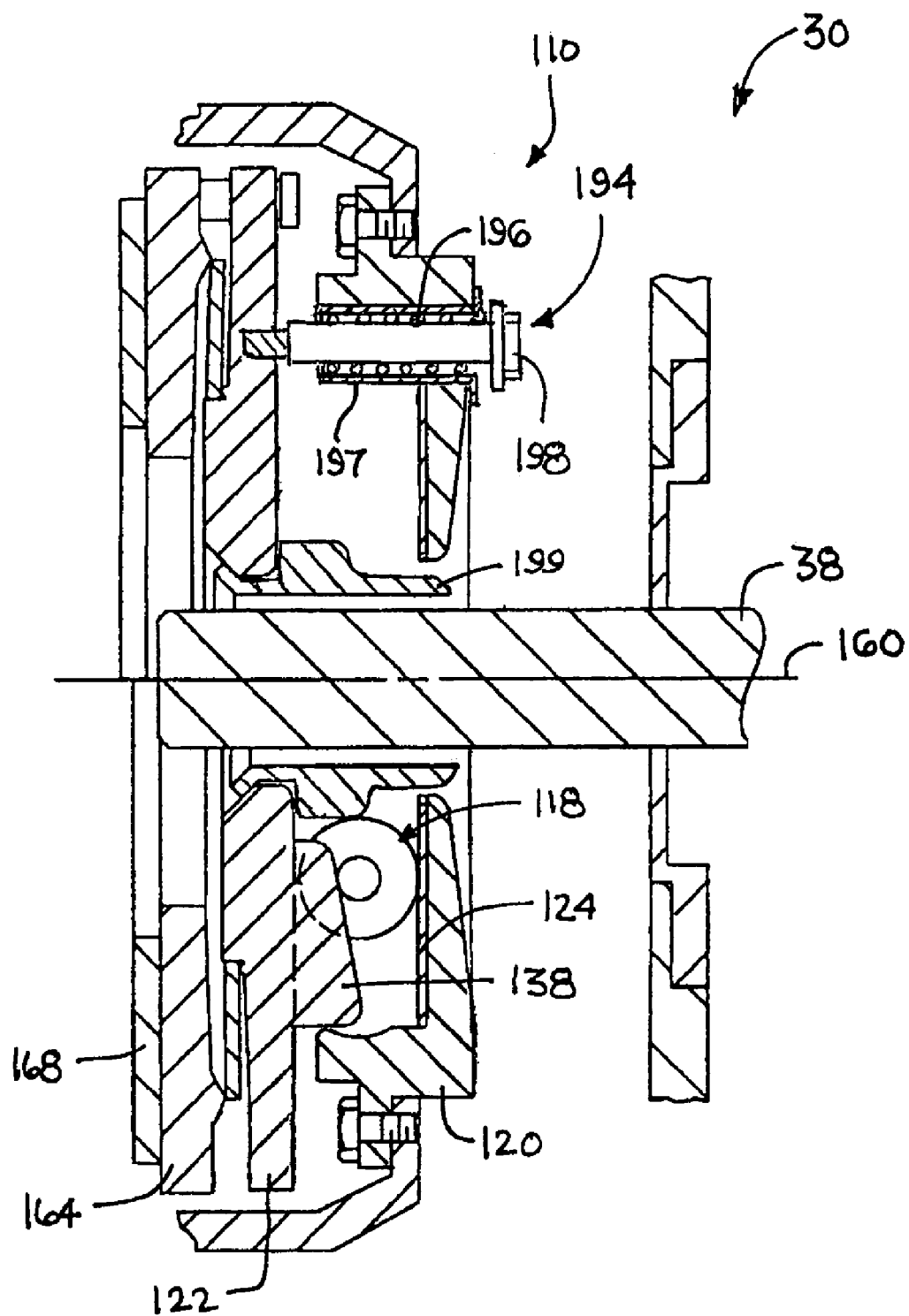
FIG. 17 is a partial cross-sectional view of a centrifugal clutch according to another embodiment of the present invention, showing the clutch in a disengaged state.

Referring to FIGS. 17 and 18, yet another embodiment of clutch 30 is shown. In the illustrated embodiment, the diaphragm return spring member 146 and reaction member 150 shown in FIGS. 4–6 and 12 are replaced with a plurality of spring biased return members 194 positioned between roller weights 118 and configured to extend axially between moveable plate 122 and fixed plate 120. In an embodiment, return members 194 each include a return spring 196, such as a coil spring, a spring sleeve 197 and a reaction member 198, such as a bolt. Spring sleeve 197 is secured to fixed plate 120 and reaction member 198 is secured to axially moveable plate 122. Return spring 196 is positioned between an inner surface of spring sleeve 197 and a shoulder on reaction member 198, and is preloaded to provide a biasing force in the disengaged position shown in FIG. 17. A stop member 199 may be positioned radially inwardly of roller weights 118 in place of reaction member 150 to support roller weights 118 in the disengaged position shown in FIGS. 17 and 18.

As roller weights 118 move outwardly under the effects of centrifugal force, movement of axial plate 122 and reaction member 198 will cause return springs 196 to compress and apply a return force to plate 122 through reaction member 198 that is generally parallel to axis 160. Further operation of the embodiment of clutch 30 shown in FIGS. 17 and 18 is substantially similar to that described above in reference to FIGS. 4–6 and 12 and will not be described in detail.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A centrifugal clutch assembly, comprising:
   an input portion fixed for rotation with an input member and an output portion fixed for rotation with an output member, the output portion including at least one friction plate secured for rotation with the output member, the input portion including a cover module secured for rotation with the input member; and
   wherein the cover module includes a pressure plate for applying a clamping force against the at least one friction plate, a moveable plate adapted to rotate with the cover module but axially displaceable with respect thereto to apply an axial force on the pressure plate, a fixed plate secured for rotation with the cover module and a plurality of weights positioned between the moveable plate and the fixed plate that are adapted to move outward under the effects of centrifugal force to cause axial movement in the movable plate and the pressure plate to exert a clamping force on the friction plate, the cover module further including at least one return spring configured to apply a return force on the weights through the moveable plate, the return force being generally parallel to the axis of rotation of the cover module, one of the movable plate and the fixed plate includes a plurality of ramps that are engaged by the weights, the ramps include first and second ramp surfaces, and wherein the return spring selectively has a generally disc-shaped configuration.

2. The centrifugal clutch assembly of claim 1, wherein the return spring is adapted to apply the return force on all of the weights.

3. The centrifugal clutch assembly of claim 1, wherein the return spring is positioned between the fixed plate and a reaction member connected to the movable plate for movement therewith.

4. The centrifugal clutch assembly of claim 3, wherein the return spring and reaction member are adapted to apply the return force by pulling on the movable plate.

5. The centrifugal clutch assembly of claim 3, wherein the return spring is a diaphragm spring.

6. The centrifugal clutch assembly of claim 5, wherein the diaphragm spring has a height to thickness ratio of approximately 1.5.

7. The centrifugal clutch assembly of claim 1, wherein the return spring is positioned between the fixed plate and a bolt connected to the movable plate.

8. The centrifugal clutch assembly of claim 1, further including a plurality of return springs.

9. The centrifugal clutch assembly of claim 1, wherein the return force is independent of weight position.

10. The centrifugal clutch assembly of claim 1, wherein the ramps taper radially outwardly and away from the corresponding movable plate or fixed plate at an increasing angle.

11. The centrifugal clutch assembly of claim 1, wherein the ramps taper radially outwardly and away from the corresponding movable plate or fixed plate at an angle of about 7 degrees adjacent a radially innermost portion of the ramps to an angle of about 13 degrees adjacent a radially outermost portion of the ramps.

12. The centrifugal clutch assembly of claim 1, wherein the cover module selectively transfers the return force imposed on the weights from the first ramp surface to the second ramp surface during disengagement of the clutch.

13. The centrifugal clutch assembly of claim 1, wherein the first and second ramp surfaces taper radially outwardly and away from the corresponding movable plate or fixed plate at different angles.

14. The centrifugal clutch assembly of claim 1, wherein the first ramp surface tapers radially outwardly and away from the corresponding movable plate or fixed plate at an increasing angle.

15. The centrifugal clutch assembly of claim 1, wherein the first ramp surface tapers radially outwardly and away from the corresponding movable plate or fixed plate at an angle of about 10.5 degrees adjacent a radially innermost portion of the first ramp surface to an angle of about 14 degrees adjacent a radially outermost portion of the first ramp surface.

16. The centrifugal clutch assembly of claim 1, wherein the second ramp surface tapers radially outwardly and away from the corresponding movable plate or fixed plate at an angle of about 5 degrees.

17. The centrifugal clutch assembly of claim 1, wherein each of the weights is a roller weight that includes a shaft-like inner roller portion, a generally cylindrical outer roller portion and a bearing positioned between the inner and outer roller portions.

18. The centrifugal clutch assembly of claim 1, wherein the moveable plate is adapted to apply an axial force on the pressure plate through a preloaded plate spring that limits the axial force applied to the pressure plate by the movable plate.

19. The centrifugal clutch assembly of claim 1, wherein the cover module includes only one return spring.

20. The centrifugal clutch assembly of claim 1, wherein the return spring reacts directly on a surface of the fixed plate.

21. The centrifugal clutch assembly of claim 1, wherein the return spring selectively operates to generally eliminate the clamping force on the friction plate.

22. A centrifugal clutch assembly for a vehicular drivetrain system, comprising:
   an input portion fixed for rotation with an engine flywheel and an output portion fixed for rotation with a transmission input shaft, the output portion including at least one friction plate secured to the transmission input shaft for rotation therewith, the input portion including a cover module secured to the engine flywheel for rotation therewith; and
   wherein the cover module includes an axial moveable pressure plate for applying a clamping force against the at least one friction plate, a ramp plate and a reaction plate, wherein one of the ramp plate and that reaction plate is adapted to rotate with the cover module but is axially displaceable with respect thereto to apply a force on the axially movable pressure plate, the other of the ramp plate and the reaction plate being fixed for rotation with the cover module, the cover module further including a plurality of roller weights positioned between the ramp plate and the reaction plate that are adapted to move outward under the effects of centrifugal force to cause axial movement in the moveable ramp plate or the moveable reaction plate and the pressure plate to exert a clamping force against the friction plate, the ramp plate including a plurality of ramps that taper radially outwardly and away from the ramp plate at an increasing angle with respect to the ramp plate, the cover module further including a return spring member configured to apply a return force against the moveable ramp plate or the movable reaction plate to bias each of the roller weights toward a pre-moved position, and wherein the cover module includes only one return spring.

23. The centrifugal clutch assembly of claim 22, wherein the return spring member is a diaphragm spring.

24. The centrifugal clutch assembly of claim 22, wherein the return spring member is a coil spring.

25. The centrifugal clutch assembly of claim 22, wherein the ramps taper radially outwardly and away from the ramp plate at an angle of about 7 degrees adjacent a radially innermost portion of the ramps to an angle of about 13 degrees adjacent a radially outermost portion of the ramps.

26. The centrifugal clutch assembly of claim 22, wherein the ramps include first and second ramp surfaces.

27. The centrifugal clutch assembly of claim 26, wherein the first and second ramp surfaces taper radially outwardly and away from the ramp plate at different angles with respect to the ramp plate.

28. The centrifugal clutch assembly of claim 26, wherein the first ramp surface tapers radially outwardly and away from the ramp plate at an increasing angle with respect to the ramp plate.

29. The centrifugal clutch assembly of claim 26, wherein the first ramp surface tapers radially outwardly and away from the ramp plate at an angle of about 10.5 degrees adjacent a radially innermost portion of the first ramp surface to an angle of about 14 degrees adjacent a radially outermost portion of the first ramp surface.

30. The centrifugal clutch assembly of claim 26, wherein the second ramp surface tapers radially outwardly and away from the ramp plate at an angle of about 5 degrees relative to the ramp plate.

31. The centrifugal clutch assembly of claim 22, wherein each of the roller weights includes a shaft-like inner roller portion, a generally cylindrical outer roller portion and a bearing positioned between the inner and outer roller portions.

32. The centrifugal clutch assembly of claim 31, wherein the ramps are engaged with one of the inner and outer roller portions.

33. The centrifugal clutch assembly of claim 22, wherein the moveable plate is adapted to apply an axial force on the pressure plate through a preloaded plate spring member that limits the axial force applied to the pressure plate by the movable plate.

34. The centrifugal clutch assembly of claim 22, wherein the return spring reacts directly on a surface of the fixed plate.

35. The centrifugal clutch assembly of claim 22, wherein the return spring is generally coaxial to at least one of the input portion and the output portion.

36. A centrifugal clutch assembly for a vehicular drivetrain system, comprising:

an input portion fixed for rotation with an engine flywheel and an output portion fixed for rotation with a transmission input shaft, the output portion including at least one friction plate secured to the transmission input shaft for rotation therewith, the input portion including a cover module secured to the engine flywheel for rotation therewith; and wherein the cover module includes an axial moveable pressure plate for applying a clamping force against the at least one friction plate, a first weight engaging plate adapted to rotate with the cover module but axially displaceable with respect thereto to apply a force on the axially movable pressure plate, a second weight engaging plate fixed for rotation with the cover module, and a plurality of roller weights positioned between the first weight engaging plate and the second weight engaging plate that are adapted to move outward under the effects of centrifugal force to cause axial movement in the first weight engaging plate and the pressure plate to exert a clamping force against the friction plate, the cover module further including a reaction member engaged for axial movement with the first weight engaging plate and at least one return spring member positioned between the reaction member and the second weight engaging plate, the return spring member configured to apply a return force against the first weight engaging plate through the reaction member to bias each of the roller weights toward a pre-moved position against the effects of centrifugal force, and wherein one of the first and second weight engaging plates includes a plurality of ramps that are engaged by the roller weights.

37. The centrifugal clutch assembly of claim 36, wherein the return spring member is one of a coil spring and a diaphragm spring.

38. The centrifugal clutch assembly of claim 36, wherein the return spring member has a height to thickness ratio of approximately 1.5.

39. The centrifugal clutch assembly of claim 36, wherein the ramps taper radially outwardly and away from the corresponding weight engaging plate at an increasing angle.

40. The centrifugal clutch assembly of claim 36, wherein the ramps taper radially outwardly and away from the corresponding weight engaging plate at an angle of about 7 degrees adjacent a radially innermost portion of the ramps to an angle of about 13 degrees adjacent a radially outermost portion of the ramps.

41. The centrifugal clutch assembly of claim 36, wherein the ramps include first and second ramp surfaces.

42. The centrifugal clutch assembly of claim 41, wherein the first and second ramp surfaces taper radially outwardly and away from the corresponding weight engaging plate at different angles.

43. The centrifugal clutch assembly of claim 41, wherein the first ramp surface tapers radially outwardly and away from the corresponding weight engaging plate at an increasing angle.

44. The centrifugal clutch assembly of claim 41, wherein the first ramp surface tapers radially outwardly and away from the corresponding weight engaging plate at an angle of about 10.5 degrees adjacent a radially innermost portion of the first ramp surface to an angle of about 14 degrees adjacent a radially outermost portion of the first ramp surface.

45. The centrifugal clutch assembly of claim 41, wherein the second ramp surface tapers radially outwardly and away from the corresponding weight engaging plate at an angle of about 5 degrees relative to the corresponding weight engaging plate.

46. The centrifugal clutch assembly of claim 36, wherein each of the roller weights includes a shaft-like inner roller portion, a generally cylindrical outer roller portion and a bearing positioned between the inner and outer roller portions.

47. The centrifugal clutch assembly of claim 46, wherein the ramps are engaged with one of the inner and outer roller portions.

48. The centrifugal clutch assembly of claim 36, wherein the reaction member is one of a sleeve and a bolt.

49. The centrifugal clutch assembly of claim 36, wherein the first weight engaging plate is adapted to apply an axial force on the pressure plate through a preloaded plate spring that limits the axial force applied to the pressure plate by the first weight engaging plate.

* * * * *